United States Patent
Kraemer

[11] 3,766,834
[45] Oct. 23, 1973

[54] PRESSOSTAT

[75] Inventor: Asger Kraemer, Nordborg, Denmark

[73] Assignee: Danfoss A/S, Nordborg, Denmark

[22] Filed: May 24, 1972

[21] Appl. No.: 256,565

[30] Foreign Application Priority Data
May 25, 1971  Germany............... P 21 25 809.3

[52] U.S. Cl............... 92/35, 73/389, 73/410, 92/37, 200/83 C
[51] Int. Cl............... F01b 19/00, F16j 3/00
[58] Field of Search ............... 92/35, 37, 39, 43; 73/410, 389; 200/83 C; 251/61

[56] References Cited
UNITED STATES PATENTS

| | | |
|---|---|---|
| 2,297,872 | 10/1942 | Carter et al............... 92/35 X |
| 2,342,579 | 2/1944 | Hagemann............... 92/35 X |
| 2,663,155 | 12/1953 | Strobell............... 92/35 X |
| 2,761,927 | 9/1956 | Szypulski............... 200/83 C |
| 2,795,239 | 6/1957 | Eckman et al............... 92/37 X |
| 2,988,282 | 6/1961 | Hottenroth............... 92/35 X |
| 3,055,219 | 9/1962 | Wilson et al............... 73/410 |

Primary Examiner—Martin P. Schwadron
Assistant Examiner—Abe Hershkovitz
Attorney—Wayne B. Easton

[57] ABSTRACT

The invention is a pressostat assembly which includes two bellows, one inside the other, which have fluid communication. Both bellows are fixedly attached to a rod form of operating member and the outer bellows operates to impart a closing movement to the operating member if the inner bellows should develop a leak. The effective cross sectional area of the outer bellows is larger that that of the inner bellows.

4 Claims, 1 Drawing Figure

PATENTED OCT 23 1973 3,766,834
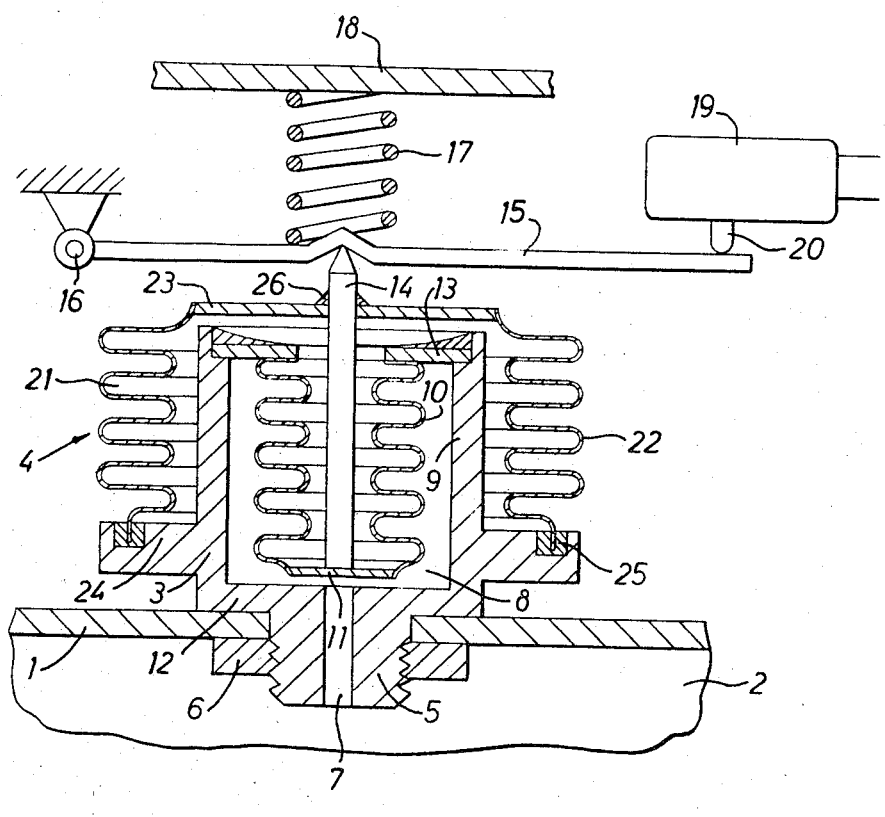

PRESSOSTAT

The invention relates to a pressostat comprising an operating element, bounded by an operating bellows or the like and connected to an installation, a spring acting in the opposite direction to that of the pressure in the operating element, and a switching member which is actuated when a pressure limit is exceeded in the operating element, the pressostat being intended for use particularly in refrigerating installations.

A pressostat of this kind is intended to actuate the switching member as soon as the pressure limit in the operating element is reached. In the case of a high pressure pressostat for a refrigerating installation, the current to the compressor motor is switched off for example when the pressure in the installation has reached a predetermined level above the normal operating pressure, as a result, for instance, of the failure of the air circulating system or of the supply of cooling water. Such pressostats are suitable as safety switches in other installations in which a medium is caused to move under pressure.

The quality of pressostats of this kind is required to be very high, since leaking of the operating element, whether due to a fracture in the operating bellows or the like or to damage to a soldered joint, will hazard the functional reliability of the equipment. Fine hair line cracks are particularly dangerous since these are not immediately detected. In a refrigerating installation, for example, refrigerant escapes from the installation over fairly lengthy periods of time without any other safety device in the installation responding to this loss.

A thermostatic valve is known in which the operating element is bounded by an inner and outer bellows. The inner bellows operates in a direction opposite to that of the spring and serves to displace the closing member. The outer bellows, under the action of the pressure that obtains in the operating element, holds a support plate, acting as a backing element for a safety spring, against a stop. When the pressure in the operating element drops, e.g. because one of the operating bellows breaks, the safety spring acts on the closing member and closes the valve.

Thermostatic valves are also known in which the operating element is constituted by the annular chamber between two parallel operating bellows so that a space through which a valve spindle can be passed remains in the annular space.

The object of the present invention is to provide a pressostat of the initially stated kind which not only operates in its normal manner but also provides a switching action soon after any damage has occurred to it.

According to the invention, this object is achieved by fitting the operating bellows in an enclosed protective chamber, part of the outer wall of which is formed by an additional bellows which likewise acts in a direction opposite to that of the spring and actuates the switching member when a pressure limit below that of the operating element is exceeded in the protective chamber.

In the case of a pressostat of this kind, a predetermined pressure, which has no effect upon the normal operation of the pressostat, normally obtains in the protective chamber. However, if the operating element or the like begins to leak, the pressure obtaining in the operating element is set up in the protective chamber. By means of an appropriate design of the additional bellows, the switching member can then be actuated even at a lower pressure. In particular, this pressure limit in the protective chamber can be below the normal pressure range of the pressostat. This means that leakage of the operating element leads to response of the switching member even during normal operation, so that the installation is switched off soon after the leak has developed.

In a preferred construction, the additional bellows surrounds the operating bellows, has a greater effective pressure surface than the latter, and is connected to the output-adjusting member of the operating element. The greater effective pressure surface results in a lower pressure in the protective chamber being sufficient to produce a force which overcomes the force of the spring exerting counter-pressure. Furthermore, the system composed of the spring, the switching member and the output-adjusting member can be the same as that used in a simple pressostat.

There are other possible ways of setting the required pressure limit in the protective chamber to a low level. For example, this can be achieved if the operating bellows and the additional bellows each engage a lever by means of an output adjusting member, but at different distances from the pivot point, and if the lever is biased by the spring in the opposite direction and is used to actuate the switching member.

Particular advantage accrues if, in addition, the pressure in the sealed-off protective chamber is below atmospheric pressure. In this way the additional bellows is self-monitoring. Thus, if a leak develops due to breakage of the additional bellows or of an associated soldered joint, atmospheric pressure is set up in the protective chamber. This pressure suffices to actuate the switching member.

A particularly simple construction is obtained if the output-adjusting member simply bears in a mechanically positive manner against the operating bellows. The two systems can then be simply fitted one within the other and soldered up. Nevertheless, a specific mode of operation is achieved in all operating conditions. Furthermore, changes in pressure in the protective chamber can occur without being impeded by the operating bellows.

The invention will now be described in greater detail by reference to an embodiment illustrated in the drawing which shows diagrammatically and in section a pressostat in accordance with the invention.

By means of the port 5, a bush 3 of a pressostat 4 is inserted into a wall 1 of a container 2 of an installation in which refrigerant circulates, and the bush is held in position by means of a nut 6. The port contains a connecting bore 7 which leads to the operating element 8. The operating element is bounded by an outer wall 9 of the bush 3, a bellows 10 having a pressure surface 11, the base 12 of the bush 3, and a ring 13 which is connected to the operating bellows 10 and is soldered to the wall 9. An output-adjusting member 14 in the form of a stem acts on a lever 15 which is adapted to swing about a pivot point 16. The lever is biased by a rated-value spring 17 which is supported by a preferably adjustable backing element 18. The free end of the lever 15 actuates a switching member 19 which is here the plunger 20 of a micro-switch.

The operating element 8 is surrounded by a protective chamber 21 which is bounded by an additional bellows 22 having a pressure surface 23, the side-wall 9 of the bush 3 and a flange 24 on this bush. The additional bellows 22 is soldered at 25 to the flange 24 and at 26 to the output-adjusting member 14. The pressure surface 23 is a multiple of the pressure surface 11. During normal operation of the system the pressure in the sealed-off protective chamber 21 is below that of the atmosphere.

The pressostat 4 operates in the following manner. If the pressure in the container 2 of the installation rises, the same pressure is set up in the operating element 8. If this pressure exceeds a predetermined level which is a certain amount above the normal operating levels, the operating bellows 10 displaces the output-adjusting member 14 thereby overcoming the force of the spring 17. This causes the lever 15 to swing in the counter-clockwise direction and the microswitch 19 to be actuated. This can be utilized for switching off the circulating system of the installation e.g. of a refrigerating machine.

If the operating bellows 10 should break, the same pressure as that in the operating element 8 is set up in the protective chamber 21 after a short time. As a result of the large pressure surface 23, a considerably lower pressure than that used in normal operation suffices to overcome the force of the rated-value spring 17 and to actuate the microswitch 19. Development of a leak in the operating element 8 therefore leads to the circulating system of the installation being switched off.

If the additional bellows 22 should break, atmospheric pressure is set up in the protective chamber 21 after a short time, whereas in normal conditions a pressure lower than that of the atmosphere is present in the said chamber. As a result of this rise in pressure, the lever 15 is again swung to overcome the force of the rated-value spring 17, and the microswitch 19 is actuated.

Thus the pressostat is not only a safety member which monitors any excessive rise in pressure in the installation, but it also prevents unintentional escape of the pressurized medium from the installation, and switches it off shortly after the occurrence of a leak in the operating element. Furthermore, those parts used for this additional function are designed to be self-monitoring.

I claim:

1. A pressostat assembly comprising a casing forming a chamber having a fluid inlet and a fluid pressure equalizing port, a first bellows in said chamber and attached to said casing, said first bellows having an open end in surrounding relation to said port, a rod inside said first bellows attached to the opposite end thereof and extending through said port, a second bellows attached to and surrounding said casing, said second bellows having one end thereof attached to said rod in fluid tight relation thereto.

2. A pressostat assembly according to claim 1 including spring means biasing said rod in the direction of said opposite end.

3. A pressostat assembly according to claim 1 wherein said second bellows has a larger effective cross sectional area than said first bellows.

4. A pressostat assembly according to claim 1 wherein the gaseous pressure internally of said first bellows is lower than atmospheric pressure.

* * * * *